United States Patent [19]

Bruntz

[11] Patent Number: 5,482,149
[45] Date of Patent: Jan. 9, 1996

[54] CLUTCH/BRAKE UNIT HAVING FRICTION DRIVE OUTPUT SHAFT

[75] Inventor: Rodney D. Bruntz, Valley Center, Kans.

[73] Assignee: The Carlson Company, Inc., Wichita, Kans.

[21] Appl. No.: 294,069

[22] Filed: Aug. 22, 1994

[51] Int. Cl.$^6$ .................................................. F16D 67/04
[52] U.S. Cl. ..................... 192/18 A; 403/370; 192/110 R
[58] Field of Search ........................... 192/18 R, 18 A, 192/18 B, 110 R, 110 S; 403/370

[56] References Cited

U.S. PATENT DOCUMENTS

| | | | |
|---|---|---|---|
| 3,246,725 | 4/1966 | Brashear, Jr. | 192/18 B |
| 3,508,618 | 4/1970 | Walberg | 403/370 X |
| 3,561,798 | 2/1971 | Redfern | 403/370 X |
| 4,553,653 | 11/1985 | Schneider | 192/18 B |
| 4,630,718 | 12/1986 | Hanks | 192/18 A |
| 4,926,989 | 5/1990 | Bruntz | 192/18 A |

*Primary Examiner*—Richard M. Lorence
*Attorney, Agent, or Firm*—Kokjer, Kircher, Bowman & Johnson

[57] ABSTRACT

A clutch/brake unit used to transmit torque from an electric motor to a gear reducer, particularly in processes that involve cyclical, start-stop operations. A special output shaft of the clutch/brake has a split portion which projects from the housing and receives a tapered plug within a tapered cavity. A bolt has a threaded connection with the plug to create wedging action which radially expands the split portion of the shaft when the bolt is turned in one direction. This expansion of the shaft creates a frictional coupling with the input hub of the gear reducer. The frictional coupling can be released by turning the bolt in the other direction to relieve the wedging force and allow the split portion of the shaft to contract radially.

11 Claims, 1 Drawing Sheet

CLUTCH/BRAKE UNIT HAVING FRICTION DRIVE OUTPUT SHAFT

FIELD OF THE INVENTION

This invention relates generally to the field of clutch/brake mechanisms of the type commonly used in process control applications. More particularly, the invention provides a clutch/brake unit having an output shaft that can be expanded in order to frictionally drive a gear reducer.

BACKGROUND OF THE INVENTION

Cyclical, start-stop process controllers employ clutch/brake units which are driven by electric motors. The output side of the clutch/brake unit drives a gear reducer. It is not uncommon for this type of device to start and stop 30–60 times per minute in a process control application. A conventional clutch/brake unit has an output shaft that has a keyed connection with the gear reducer it drives. The key transmits torque from the shaft to the gear reducer.

In order to allow installation, clearance is necessarily provided between the shaft and the bore in which it fits, and also between the key and the keyway. Because of the cyclical starting and stopping of the output shaft, the key pounds alternately against opposite sides of the keyway as the torque reverses. The clearance between the shaft and bore also results in enough play that the shaft and bore wall pound against one another. As a result of these cyclical impact forces, the key and keyway as well as the shaft and bore are subjected to undue stresses which can cause one or more of these parts to fail prematurely.

SUMMARY OF THE INVENTION

The present invention is directed to a clutch/brake mechanism which avoids the problems of excessive stresses and wear on the output shaft and related components. In accordance with the invention, a clutch/brake unit is equipped with a specially constructed output shaft. The shaft is split so that it can expand radially. A tapered plug is fitted in a tapered cavity which is formed in the split portion of the output shaft. A bolt is threaded into the plug in order to cause the plug to slide back and forth in the tapered cavity when the bolt is rotated in opposite directions.

The plug is initially positioned in the cavity at a location where the shaft is contracted sufficiently to allow it to be inserted into the bore of the gear reducer in a slip fit. When the bolt is then turned in a direction to draw the plug into the cavity, the split portion of the output shaft expands radially against the bore wall. Expansion of the shaft creates an interference fit that is tight enough to eliminate the need for a drive key, as the friction between the shaft and bore wall is sufficient to transmit the torque from the shaft to the gear reducer.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
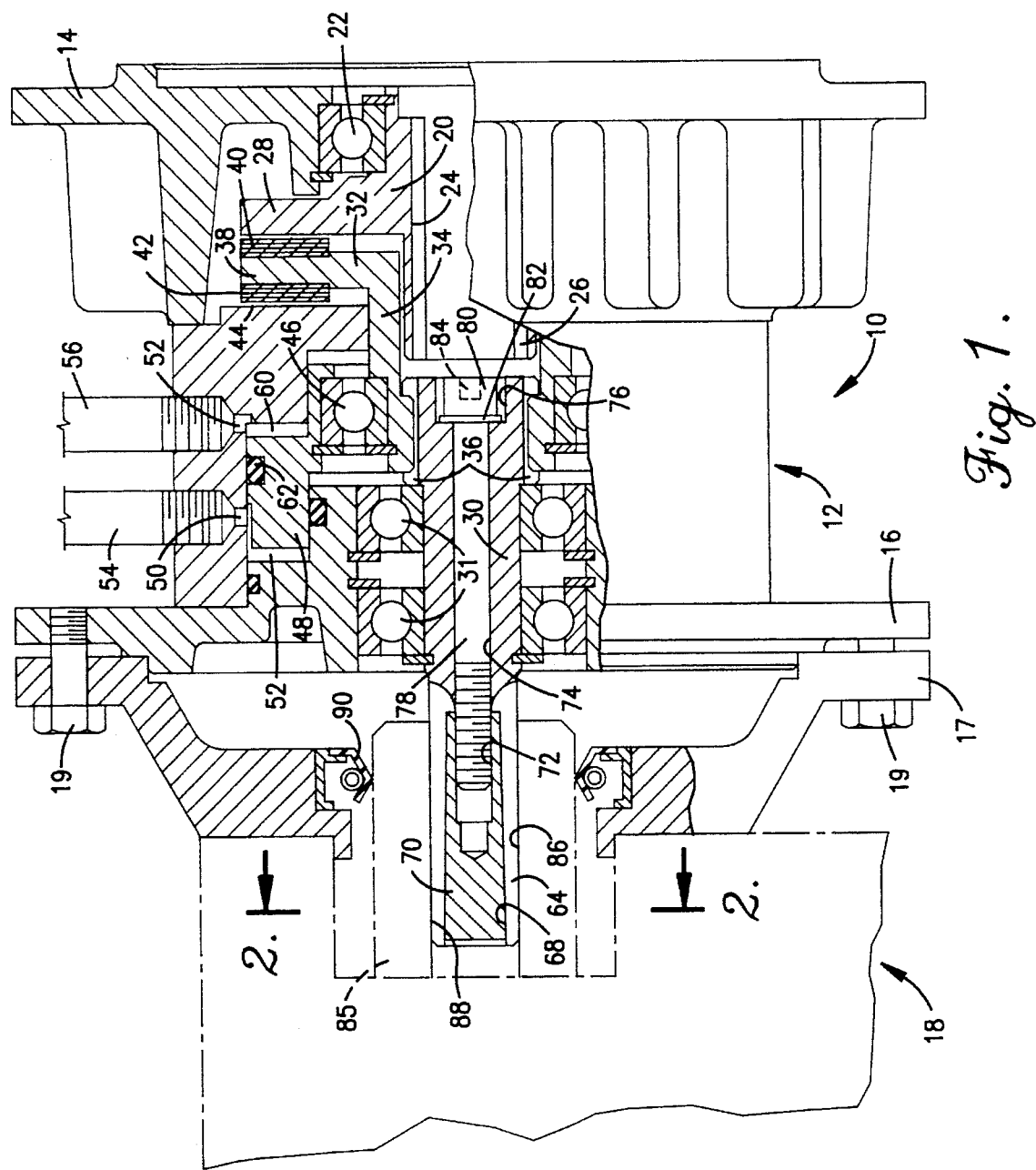
FIG. 1 is a fragmentary elevational view, partially in cross-section, of a clutch/brake unit constructed according to a preferred embodiment of the present invention, with the output shaft of the unit shown inserted into the bore of a gear reducer which is depicted in phantom lines.

With initial reference to FIG. 1, numeral 10 generally designates a clutch/brake mechanism which is constructed in accordance with the present invention. The mechanism 10 has a stationary housing 12 in which the principal components of the mechanism are contained. The input side of the housing 12 is provided with a peripheral flange 14 which may be bolted to a NEMA C-face electric motor (not shown) which drives the mechanism. The output side of the housing 12 has a similar mounting flange 16 which may be connected to a mounting flange 17 of a NEMA C-face gear reducer such as that identified generally by numeral 18 in FIG. 1. Screws 19 may be used to connect the flanges 16 and connection 17 of unit 10.

The clutch/brake mechanism 10 includes an input hub 20. A ball bearing 22 supports the hub 20 for rotation in the housing 12. The hub 20 has a central bore 24 which extends along the axial center line of the mechanism 10. The output shaft of the electric motor is received in the bore 24 and is connected to the hub 20 by a key and keyway 26 which provide a driving connection between the motor shaft and the input hub 20 of the clutch/brake mechanism. The hub 20 includes a radially extending disk 28 which serves as a clutch plate, as will be explained more fully.

An output shaft 30 is centered on the axial center line of the mechanism 10. A pair of ball bearings 31 support the shaft 30 for rotation within the housing 12. A rotor 32 has a sleeve portion 34 which fits partially around the hub 20 and is connected with one end of the output shaft 30 by a plurality of splines 36. Extending radially from one end of the sleeve portion 34 of rotor 32 is a disk 38. The surface of the disk 38 which faces toward the clutch plate 28 is provided with annular clutch lining elements 40 which exhibit high friction characteristics. The opposite surface of the disk 38 is provided with a plurality of brake lining elements 42 which similarly exhibit high friction characteristics. The brake elements 42 confront a brake plate 44 which is formed as a surface on the housing 12.

A ball bearing 46 is fitted between the sleeve portion 34 of rotor 32 and a non-rotating piston 48 which is generally annular in shape. The piston 48 is mounted to slide longitudinally within the housing 12 and carries the rotor 32 longitudinally with it. The piston is controlled by pneumatic pressure that may be applied to a clutch inlet port 50 or to a brake inlet port 52. Pneumatic lines 54 and 56, respectively, extend to ports 50 and 52 from an air compressor or similar source of air.

Port 50 connects with an air chamber 58 which is formed between the piston 48 and the housing 12. When air is applied to chamber 58 through the port 50, the piston 48 is urged in a direction to the right as viewed in FIG. 1, thus moving the rotor 32 to the right and pressing the clutch lining elements 40 against the clutch plate 28. This establishes a frictional coupling through rotor 32 between the input hub 20 and the output shaft 30. The other port 52 connects with another air chamber 60 which is located such that when air is applied to it, the piston 48 is urged to the left as viewed in FIG. 1. The rotor 32 is moved to the left along with the piston, thus pressing the brake lining elements 42 against the brake plate 44. This applies a frictional braking force to the output shaft 30 through rotor 32 and thus brakes the shaft. Seal rings 62 provide seals between the piston 48 and the housing 12.

Figure 2:
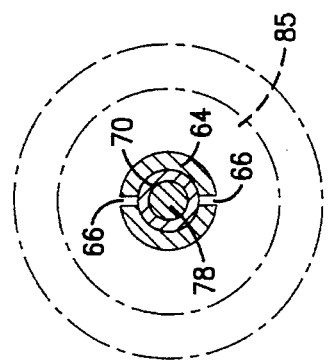
FIG. 2 is a sectional view taken generally along line 2—2 of FIG. 1 in the direction of the arrows.

The output shaft 30 of the clutch/brake mechanism has a projecting end portion 64 which extends out of the housing 12. The end portion 64 is split. As best shown in FIG. 2, two diametrically opposed slits 66 are formed in the wall of end portion 64 to provide the split construction. Within the end portion 64, a frusto-conical cavity 68 is formed. The cavity 68 is centered on the longitudinal axis of shaft 30 and extends to the free end of the shaft. The cavity 68 tapers as it extends away from the free end of the shaft.

A tapered plug 70 is received in the cavity 68. The configuration of the plug 70 is complemental to that of the cavity 68. The plug 70 fits snugly in the cavity 68 and is able to slide back and forth in the cavity 68 in a direction longitudinally of the shaft 30. Movement of plug 70 inwardly (to the right as viewed in FIG. 1) creates a wedging effect as the tapered surface of the plug acts against the tapered surface of cavity 68. The result is that the end portion 64 expands radially. Opposite movement of plug 70 relieves the wedging force and allows portion 64 to radially contract. An internally threaded passage 72 extends into the smaller end of plug 70 and is centered on the longitudinal axis of shaft 30.

The main portion of the output shaft 30 is provided with a passage 74 which connects with the cavity 68 at one end and with a counter bore 76 at the other end. The counter bore 76 is formed at the inner end of the shaft 30. A draw bolt 78 has the main portion of its shank extending through the passage 74 and is threaded on one end to mate with the threads of the passage 72 formed in plug 70. The bolt 78 has an enlarged head 80 which is located in the counter bore 76 and seats on a washer 82. The head 80 is provided with a recess 84 in its end face for receiving a wrench or similar tool that is used for rotation of the bolt 78. The bolt head 80 and recess 84 are aligned with the bore 24 of the input hub 20 so that they are accessible by a tool extended through the bore 24. By reason of the threaded connection between the bolt 78 and the plug 70, rotation of the bolt in opposite directions causes the plug 70 to move longitudinally in opposite directions.

The gear reducer 18 has an input hub 85 which presents a bore 86 surrounded by a bore wall 88. The NEMA C-face construction of the reducer includes a seal 90 which seals against the hub 85. It is noted that the construction for the NEMA C-face unit 18 precludes access to the hub 85 when the reducer is connected with the clutch/brake mechanism 10.

When the plug 70 is in the position shown in FIG. 1, the outside diameter of the end portion 64 of shaft 30 is slightly smaller than the diameter of the bore 86 such that the end portion 64 can be inserted into the bore 86 in a slip fit. After the end portion 64 has been fully inserted into the bore 86, the bolt 78 is turned in a direction to draw the plug 70 inwardly (to the right as viewed in FIG. 1). As the plug 70 is pulled into cavity 68, the plug applies wedging action to the end portion 64 and causes portion 64 to radially expand as the tapered surfaces of the plug and cavity 68 interact. The bolt 78 can be turned to effect a tight as fit as desired of the split section 64 in the bore 86. When the bolt has been tightened sufficiently, the end portion 64 fits tightly enough against the bore wall 88 that rotation of the shaft 30 is transmitted to the hub 85 of gear reducer 18 by reason of the frictional coupling that is effected between the output shaft and gear reducer. The clutch/brake mechanism 10 can then be driven by an electric motor (not shown) in the usual manner to transmit torque to the gear reducer 18.

The output shaft 30 can be released from the gear reducer 18 by rotating the bolt 78 in a direction to advance the plug 70 toward the free end of shaft portion 64. Because the end section 64 of the shaft is tightly wedged against the bore wall 88, rotation of bolt 78 in a direction to release the shaft will normally not move plug 70 but will cause the bolt 78 to move longitudinally (to the right as shown in FIG. 1). When this occurs, a rod or similar implement (not shown) can be extended through the bore 24 and against the bolt head 80, and the rod can be tapped with enough force to cause the bolt head 80 to seat against the washer 82 at the bottom of the counter bore 76. This movement of the bolt carries the plug 70 to the proper position in which the split end portion 64 of the shaft is allowed to radially contract as necessary to release the friction or interference fit between portion 64 and the bore wall 88. The end portion 64 can then be slipped out of the bore 86 after the screws 19 have been removed.

It is thus evident that the clutch/brake unit 10 of the present invention provides an output shaft that can be frictionally coupled with the wall 88 of bore 86, thus creating a frictional coupling of the clutch/brake unit with the gear reducer 18. This arrangement eliminates the problem of wear on the shaft and bore wall, as well as on the keys and keyways that are conventionally used for coupling of the shaft to the gear reducer. It also provides a responsive and reliable drive connection that functions well in the cyclical, start-stop operations that form one of the principal uses of the clutch/brake unit. Because the bolt head 80 is easily accessible through the bore 24, coupling of the clutch/brake mechanism to the gear reducer 18 and uncoupling of the two units can be quickly and easily accomplished.

It should be noted that the split portion 64 of the output shaft 30 can be constructed in various different ways to achieve the expansion and contraction that is necessary to allow the shaft to be coupled to and uncoupled from the gear reducer. For example, portion 64 may have various configurations and/or virtually any number of slits 66. In addition, mechanisms other than the bolt 78 may be used to effect the wedging action that takes place when the plug 70 is retracted into the cavity 68.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A clutch/brake mechanism for driving a gear reducer having an input bore surrounded by a bore wall, said mechanism comprising:

a housing;

an input hub supported in said housing for rotation and adapted to be driven rotatively;

an output shaft supported in said housing for rotation;

clutch means in said housing for applying a frictional force in a manner to frictionally couple the input hub with the output shaft to drive the output shaft;

brake means in said housing for applying a frictional braking force in a manner to frictionally brake the output shaft;

means for selectively activating said clutch means;

means for selectively activating said brake means;

a split portion of said output shaft adapted to fit in the input bore of the gear reducer; and wedge means for radially expanding said split portion to press said split portion against the bore wall in a manner to frictionally couple the output shaft with the gear reducer for driving of the gear reducer by the output shaft.

2. The mechanism of claim 1, wherein said wedge means comprises:

a tapered cavity in said split portion of the output shaft;

a tapered plug in said cavity adjustable therein in a direction longitudinally of the output shaft; and means for effecting movement of said plug in said cavity in a direction to expand said split portion.

3. The mechanism of claim 2, wherein said movement effecting means comprises:

an adjustment element for the plug; and means for establishing a threaded connection between said adjustment element and said plug in a manner to longitudinally adjust the plug in the cavity in opposite directions when said adjustment element is turned in opposite directions.

4. The mechanism of claim 3, including a head portion of said adjustment element accessible through said input hub to effect turning of the element.

5. In a clutch/brake unit having a housing, a rotatable input hub, a rotatable output shaft, clutch means for frictionally coupling the input hub with the output shaft and brake means for frictionally braking the output shaft, the improvement comprising:

an end portion of said output shaft having a size to fit in a gear reducer bore which is surrounded by a bore wall, said end portion being split in a manner allowing generally radial expansion and contraction thereof; and wedge means in said output shaft for expanding the split portion thereof radially against the bore wall in a manner to frictionally couple the output shaft with the gear reducer.

6. The improvement of claim 5, wherein said wedge means comprises:

a tapered cavity in said end portion of the output shaft;

a tapered plug in said cavity adjustable therein in a direction longitudinally of the output shaft; and means for effecting movement of said plug in said cavity in opposite directions to expand the end portion upon movement of the plug in one direction and to allow contraction of the end portion upon movement of the plug in the opposite direction.

7. The improvement of claim 6, wherein said movement effecting means comprises a bolt having a threaded connection with said plug to move the plug in opposite longitudinal directions when the bolt is turned in opposite rotative directions.

8. The improvement of claim 7, wherein said bolt has a head accessible through said input hub to effect turning of the bolt.

9. A clutch/brake mechanism for driving a gear reducer having an input bore defined within a bore wall, said mechanism comprising:

a housing;

an input hub supported for rotation in the housing;

an output shaft supported for rotation in the housing and having a projecting end portion projecting out of the housing for insertion into the input bore of the gear reducer, said projecting end portion presenting a tapered cavity therein and being split to allow radial expansion and contraction of said end portion;

a tapered plug received in said cavity for movement therein longitudinally in the output shaft, said plug being arranged to radially expand said end portion upon movement in one direction and to allow radial contraction of said end portion upon movement in the opposite direction;

means for selectively moving said plug in said one direction to effect expansion of said end portion against the bore wall in a manner to frictionally couple the output shaft with the gear reducer, and in said opposite direction to release the output shaft from the bore;

clutch means for effecting frictional coupling of said input hub with said output shaft; and brake means for frictionally braking said output shaft.

10. The mechanism of claim 9, wherein said means for selectively moving said plug comprises a bolt having a threaded connection with said plug to effect longitudinal movement of the plug in opposite directions when the bolt is turned in opposite rotative directions.

11. The improvement of claim 10, wherein said bolt has a head accessible through said input hub to effect turning of the bolt.

* * * * *